United States Patent [19]

Shahid

[11] Patent Number: 5,287,426
[45] Date of Patent: Feb. 15, 1994

[54] METHODS FOR MAKING OPTICAL FIBER CONNECTORS

[75] Inventor: Muhammed A. Shahid, Ewing Township, Mercer County, N.J.

[73] Assignee: AT&T Bell Laboratories, Murray Hill, N.J.

[21] Appl. No.: 20,931

[22] Filed: Feb. 22, 1993

[51] Int. Cl.$^5$ ................................................. G02B 6/38
[52] U.S. Cl. ........................................ 385/85; 385/59; 385/71; 385/83
[58] Field of Search .................. 385/59, 71, 75, 76, 385/83, 85, 88, 55, 14; 264/40.1; 425/116

[56] References Cited

U.S. PATENT DOCUMENTS

| | | | |
|---|---|---|---|
| 4,784,460 | 11/1988 | Khoe | 385/71 |
| 4,818,058 | 4/1989 | Bonanni | 385/71 |
| 4,933,262 | 6/1990 | Beguin | 385/14 |
| 4,998,796 | 3/1991 | Bonanni et al. | 385/83 |

OTHER PUBLICATIONS

"Assembly Techniques and Packaging," in VLSI Technology, edited by S. M. Sze, (McGraw-Hill Book Company 1983), pp. 575-581 (no month).

*Primary Examiner*—Akm E. Ullah
*Attorney, Agent, or Firm*—Roderick B. Anderson

[57] ABSTRACT

A middle portion (13) of an optical fiber encapsulation (11) of an optical fiber ribbon is selectively removed, while leaving intact separated ribbon portions (14, 15) and optical fiber portions (12) extending between the separated ribbon portions. The exposed optical fiber portions are next contained between a pair of first optical fiber support members (18, 19) on opposite sides of the fiber portions. The support members are then preferably contained and encapsulated (FIGS. 7, 8) by injection molding plastic around them, which additionally reinforces the adjacent optical fiber ribbon portions. The optical fiber ribbon is cut for use by cutting transversely through the first support members and the optical fiber portions. This exposes optical fiber ends (27) which are polished for alignment and abutment to other optical fiber ends. The optical fiber support members also define an alignment aperture (20) that extends substantially parallel to the optical fiber portions. Second optical fiber support members supporting second optical fibers are then aligned with the optical fiber portions by an alignment pin (29) inserted into the alignment aperture. Connectors can be mounted at periodic intervals on an entire reel of optical fiber ribbon (FIG. 12).

18 Claims, 4 Drawing Sheets

METHODS FOR MAKING OPTICAL FIBER CONNECTORS

TECHNICAL FIELD

This invention relates to optical fiber interconnections and, more particularly, to techniques for interconnecting optical fiber ribbons.

BACKGROUND OF THE INVENTION

Optical fibers are coming into increasingly widespread use as an alternative to copper conductors for high-capacity transmission of information. One popular form in which optical fibers are marketed is as optical fiber ribbons, each ribbon comprising a parallel array of optical fibers joined and encapsulated by a plastic encapsulation. Optical fiber ribbons are mass-produced and are often marketed in the form of reels, that is, a length of optical fiber ribbon wound around a cylinder or spool.

Optical fiber ribbon is normally used by cutting a length of ribbon from the reel, stripping the encapsulation from the ends, and manually attaching optical fiber connectors to the fibers protruding from the ends of the ribbon. One example of an optical fiber connector is described in the patent of Bonanni, U.S. Pat. No. 4,818,058, granted Apr. 4, 1989, which comprises a pair of silicon fiber support members into which V-grooves have been made by masking and etching. Free ends of the optical fibers are clamped between V-grooves of the silicon support members. The V-grooves precisely locate the optical fibers of the ribbon so that they can be abutted against a similar connector containing optical fiber ends that are abutted and registered in precise axial alignment. This permits lightwaves on the optical fiber to travel freely through the connector and through the newly connected optical fiber.

Since optical fiber ribbon is now in the nature of a commodity, it is important to reduce the cost at which it and its connectors can be made. Thus, any advance that would allow connectors to be more conveniently attached to optical fiber ribbon, or which would make optical fiber ribbon transmission lines easier to use, would be considered an important and valuable contribution.

SUMMARY OF THE INVENTION

In an illustrative embodiment of the invention, a middle portion of the optical fiber encapsulation of an optical fiber ribbon is selectively removed, while leaving intact separated ribbon portions and optical fiber portions extending between the separated ribbon portions. The exposed optical fiber portions are next contained between a pair of first optical fiber support members on opposite sides of the fiber portions. The support members are then preferably contained and encapsulated by injection molding plastic around them, which protects the support members and additionally reinforces the adjacent optical fiber ribbon portions. The optical fiber ribbon is cut for use by cutting transversely through the first support members and the optical fiber portions. This exposes optical fiber ends which are polished for abutment and alignment to other optical fiber ends.

Preferably, the optical fiber support members define an alignment aperture that extends substantially parallel to the optical fiber portions. Second optical fiber support members supporting second optical fibers are then aligned with the optical fiber portions by an alignment pin inserted into the alignment aperture. Connectors can be provided at periodic intervals on an entire reel of optical fiber ribbon prior to cutting. The ribbon segments can then be successively cut by cutting through the encapsulated connectors. Thus, the invention facilitates both the mounting of connectors on optical fiber ribbon and the use of such ribbon.

These and other embodiments, features and benefits of the invention will be better understood from the following detailed description taken in conjunction with the accompanying drawing.

DETAILED DESCRIPTION

Figure 1:
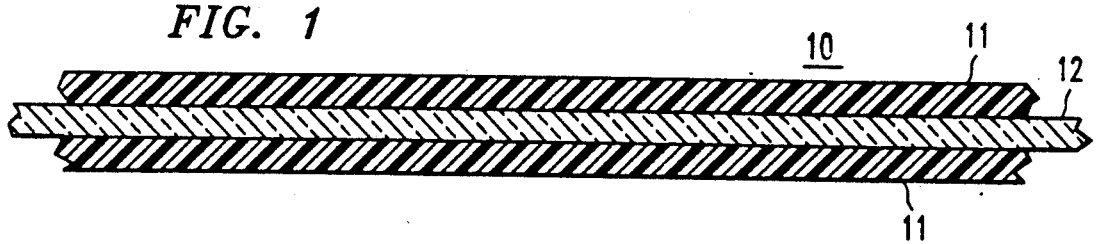
FIG. 1 is a sectional view of part of an optical fiber ribbon.
Figure 2:
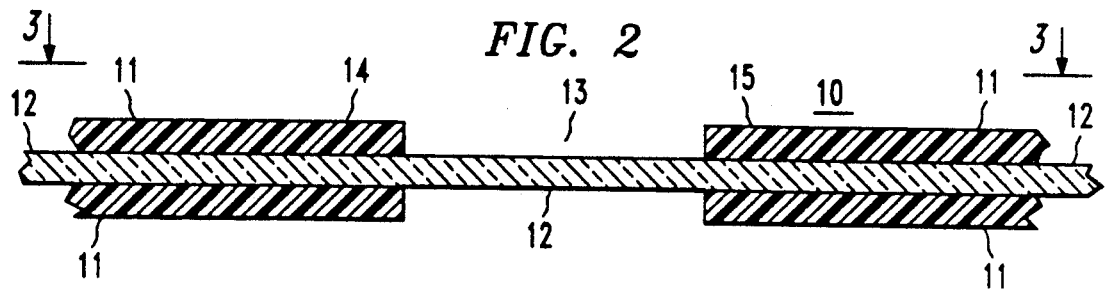
FIG. 2 is a view of the optical fiber ribbon of FIG. 1 after a mid portion of the ribbon encapsulation has been removed in accordance with one embodiment of the invention.

Referring now to FIG. 1, there is shown schematically a side sectional view of an optical fiber ribbon 10 comprising an encapsulation 11 containing an array of parallel optical fibers 12, only one of which is shown. Referring to FIG. 2, in accordance with an illustrative embodiment of the invention, the first step in applying connectors to the optical fiber ribbon 10 is to remove selectively a middle portion 13 of the encapsulation 11, while leaving intact ribbon portions 14 and 15 and the optical fiber 12 extending between the ribbon portions. As can be seen from FIG. 3, the optical fiber ribbon 10 illustratively contains five parallel optical fibers 12, segments of which extend between opposite ribbon portions 14 and 15.

Figure 3:
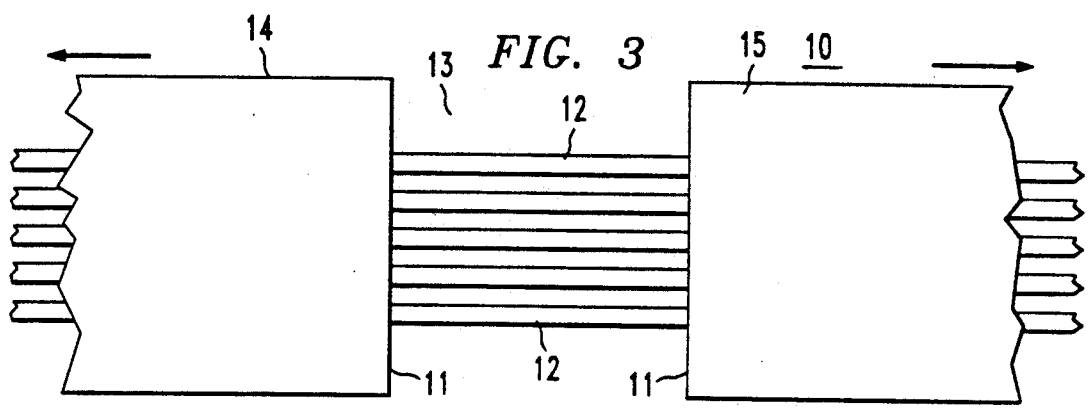
FIG. 3 is a top view of FIG. 2.
Figure 4:
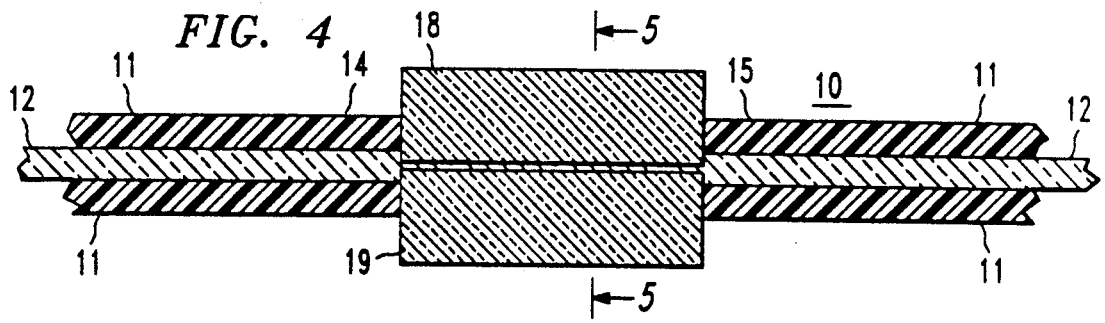
FIG. 4 is a view of the ribbon of FIG. 2 at a subsequent stage of assembly of an optical fiber ribbon connector in accordance with one embodiment of the invention.
Figure 5:
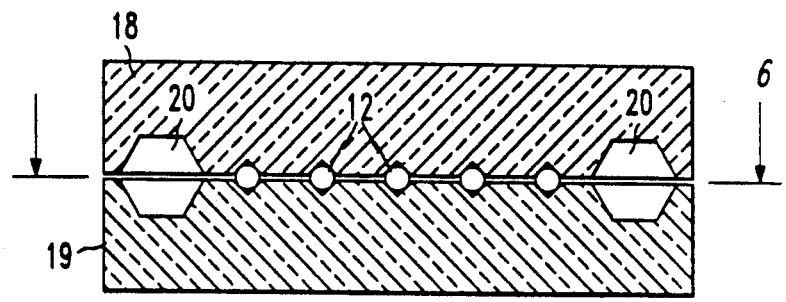
FIG. 5 is a view taken along lines 5—5 of FIG. 4.
Figure 6:
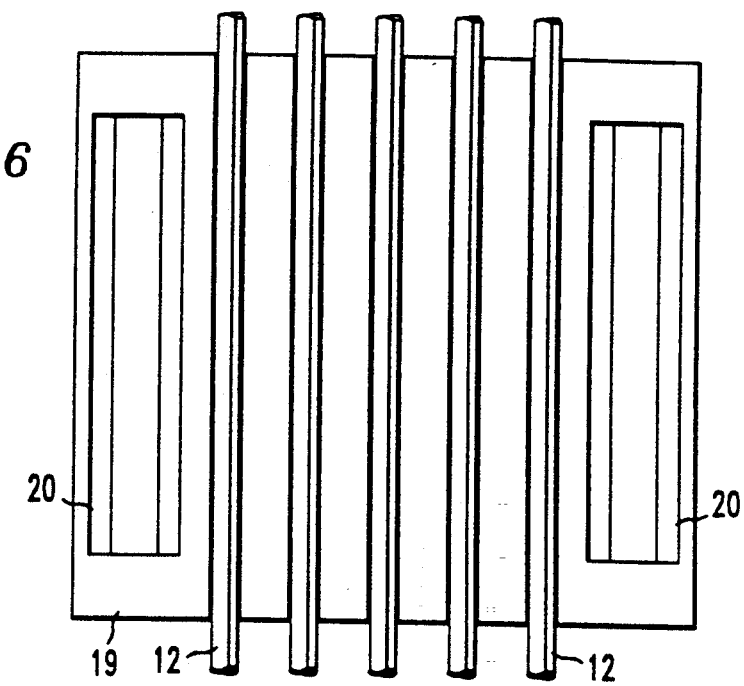
FIG. 6 is a view taken along lines 6—6 of FIG. 5.

The next step, illustrated in FIGS. 4, 5 and 6, is to locate a matching pair of optical fiber support members 18 and 19 on opposite sides of the exposed fiber segments 12 of FIG. 3. The support members 18 and 19 are illustratively of a monocrystalline material such as silicon and are fabricated according to the principles outlined in the U.S. patents of Bonanni et al., U.S. Pat. No.

4,998,796, granted Mar. 21, 1991, and Bonanni, U.S. Pat. No. 4,818,058, granted Apr. 4, 1989, both incorporated herein by reference. That is, they are made by photolithographically masking and etching V-grooves on matching sides of each pair of the support members 18 and 19, the V-grooves being shown in FIG. 5. Each pair of matching V-grooves then encompasses and supports one of the optical fibers 12. As is known, V-grooves can be made with great precision in monocrystalline materials such as silicon, since side walls of the grooves are defined by crystallographic planes.

A pair of alignment apertures 20, shown in FIGS. 5 and 6, are also made by photolithographically masking and etching matching grooves into support members 18 and 19. As shown in FIG. 6, the alignment apertures 20 do not extend entirely along the lengths of support members 18 and 19, but rather are sealed off at their opposite extreme ends. As will become clear later, this is important for preventing encapsulant compound from being introduced into the apertures 20.

An advantage of the FIG. 5 structure is that the optical fibers 12 center or "self-align" within matching grooves. The two optical fiber support members 18 and 19 are preferably bonded together with an adhesive such as epoxy, but care should be taken to assure that no epoxy is introduced into the alignment apertures 20, since if it were it could interfere with alignment, as will become clear later. The epoxy may, however, extend into the V-grooves to bond the fiber segments to the support members. Depending on the type of fiber and its intended use, the customary polymer fiber coating on the optical fiber segments may or may not be stripped prior to applying the support members 18 and 19. Referring to FIG. 3, when the support members are applied, the optical fibers 12 are preferably placed in tension by applying tension to the fiber ribbon as shown by the oppositely directed arrows; this tends to make the optical fibers parallel for an appropriate fit within the V-grooves.

Figure 7:
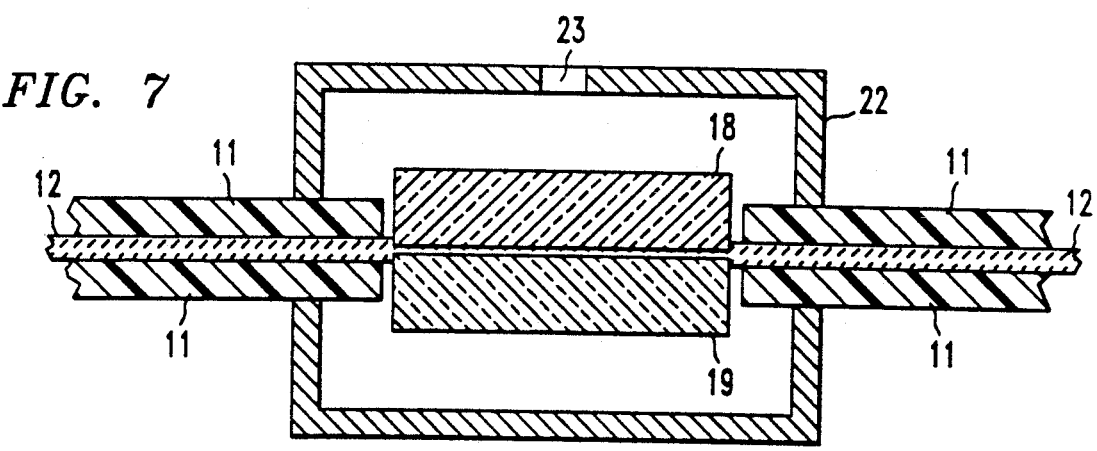
FIGS. 7 and 8 are views of the structure of FIG. 4 at subsequent stages of fabrication.

Referring to FIG. 7, the bonded support members 18 and 19 are next placed in a mold 22 having an aperture 23 into which molding compound is injected as is described, for example, in pages 574–581 of the book, "VLSI Technology," by S. M. Sze, *McGraw Hill Book Company*, 1983. The molding compound may be injected at approximately one hundred seventy-five degrees Centigrade at pressures of about six megapascals. The molding compound may be any of various epoxies, thermoplastic polymers, silicones, or other plastics, as are known in the art. The compound covers support members 18 and 19 and part of the optical fiber encapsulation 11 but, as mentioned before, is not injected into alignment apertures 20 of FIGS. 4 and 5.

Figure 8:
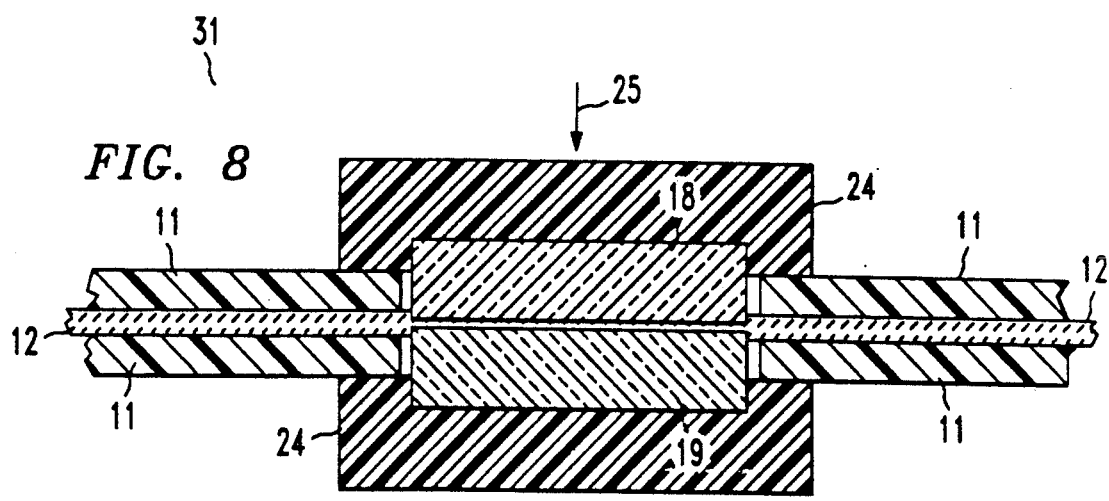

As shown in FIG. 8, after the molding compound has hardened, it forms an encapsulation 24 which provides both protection and mechanical support to support members 18 and 19. At this stage, the structure is completely self supporting, and optical fiber can be stored for future use as will be discussed later with reference to FIG. 12. Notice that the encapsulation 24 provides mechanical support to the ends of fiber encapsulation 11 and to locations at which the optical fiber 12 enters support members 18 and 19, regions that are susceptible to stress.

Figure 9:
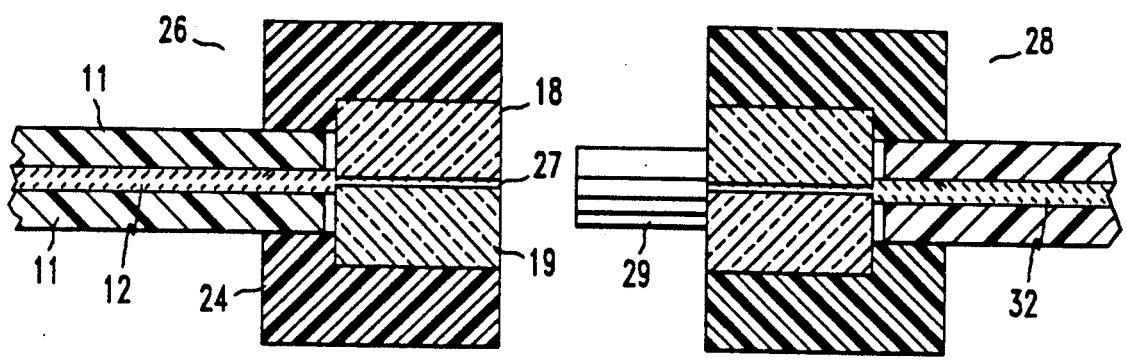
FIG. 9 is a sectional view of the structure of FIG. 8 at a subsequent stage of fabrication showing how optical fiber connections to other optical fiber ribbon can be made in accordance with one embodiment of the invention.

Prior to actual use of the package as a lightwave transmission element, the package is cut transversely with respect to the optical fiber 20 as shown by the arrow 25. A saw of the type used for cutting semiconductor elements may be used for this purpose. As shown in FIG. 9, after the cut has been made, the half of the package 26 that surrounds the optical fiber 12 constitutes a connector for that optical fiber 12. The portion of the package of FIG. 8 to the right of arrow 25 is not shown in FIG. 9. Rather, FIG. 9 shows a mating connector 28 for aligning optical fiber 32 with optical fiber 12 through the use of a pair of alignment pins 29, only one of which is shown. Referring again to FIGS. 5 and 6, when the optical fiber support members 18 and 19 are transversely cut, the alignment apertures 20 are exposed along with the optical fiber ends. The ends 27 (FIG. 9) are then polished to make them suitable for connection to the optical fibers 32 of mating connector 28. It should be noted that the cutting step of FIG. 8 results in two optical fiber connectors, one to the left of arrow 25, and one to the right.

Figure 10:
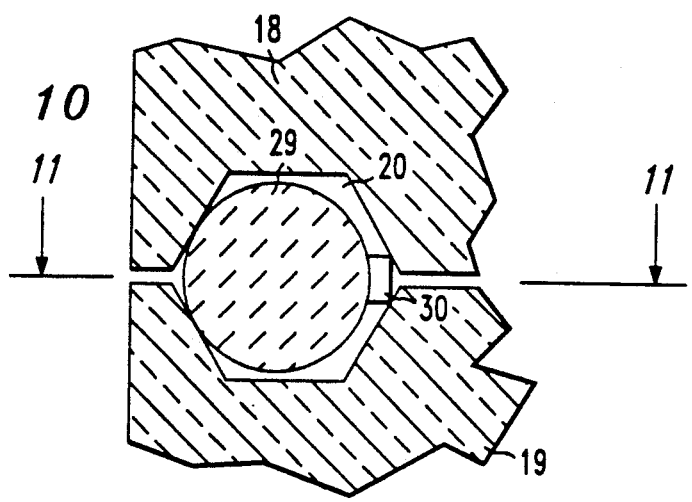
FIG. 10 is a sectional view showing how an alignment pin such as that shown in FIG. 9 can be used for aligning optical fiber.
Figure 11:
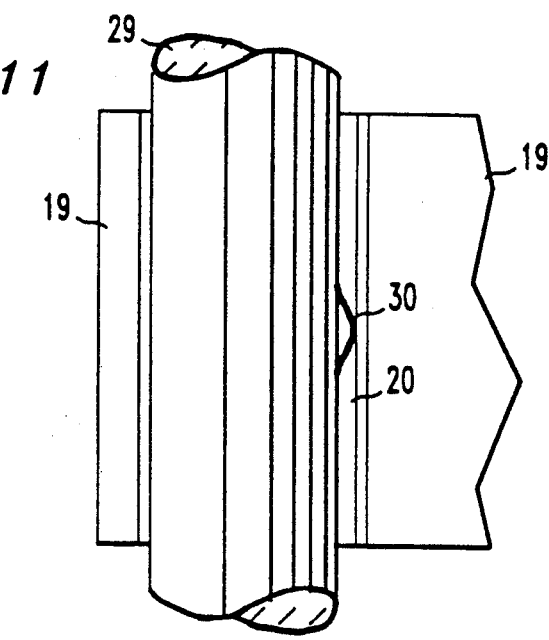
FIG. 11 is a view taken along lines 11—11 of FIG. 10.

The alignment pins 29 can be inserted into alignment apertures 20 as illustrated in FIGS. 10 and 11. The alignment pin 29 may have a spring 30 which biases it against one side of the alignment aperture 20. Since, as mentioned before, side walls of alignment aperture 20 can be made with great precision, abutment against a reference surface of the alignment aperture accurately positions the alignment pin. The connector 28 (FIG. 9) may have a similar alignment aperture for receiving alignment pin 29. With the alignment pin being abutted against corresponding reference surfaces of the connectors 26 and 28 of FIG. 8, the two connectors can be accurately aligned. Alternatively, the pin 29 may be permanently supported in connector 28 to make it a male connector that can be plugged to mating connectors such as connector 26.

The plastic constituting the ribbon encapsulation 11 is typically an acrylate; acrylate is also commonly used as the outer layer of optical fiber. This plastic can be selectively removed by etching by exposing it, for example, to methylene chloride or to any of various commercially available paint strippers. Alternatively, the ribbon encapsulation could be chosen to be different from that of the outer layer of the optical fiber to permit selective etching of the ribbon encapsulation, while leaving the fiber cladding intact. The ribbon encapsulation can alternatively be removed by locally heating the middle portion 13 of the ribbon and mechanically stripping the softened encapsulation from the fiber. Optical fiber ribbon typically contains twelve parallel fibers and is available with as many as thirty-two; the example shows five fibers only for reasons of simplicity and clarity.

Figure 12:
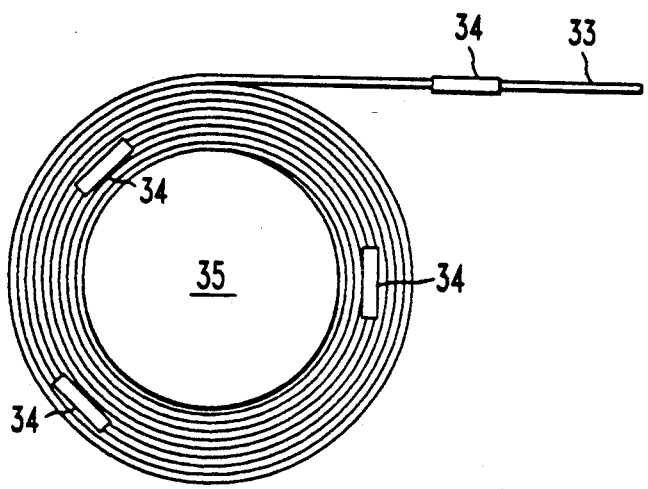
FIG. 12 is a view showing how connectorized optical fiber ribbon can be mounted on a spool.

An advantage of the invention is that the optical fiber ribbon can be "connectorized" at the factory. That is, a multiplicity of connectors can be provided at predetermined intervals. The "connectorized" fiber ribbon may then be stored in the usual manner as a reel as shown in FIG. 12. That is, optical fiber ribbon 33, containing a plurality of unsevered optical fiber connectors 34, is wound about a cylindrical spool 35 for storage and convenience of use. When a length of fiber ribbon is to be used, appropriate cuts are made through two of the connectors 34 to produce a fully connectorized length of optical fiber ribbon.

Figure 13:
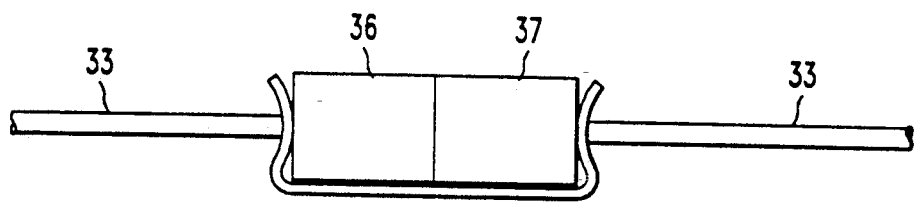
FIG. 13 is a view of two mated connectors in accordance with one aspect of the invention.

Referring to FIG. 13, when two fiber ribbon connectors 36 are aligned by the indexing pins as described before, it may be desirable to use a mechanical clip 38 to provide a compressive axial force on the connectors 36 and 37 to keep them from becoming disconnected. Alternatively, various other friction elements or springs may be used for keeping the connectors 36 and 37 from sliding apart.

Figure 14:
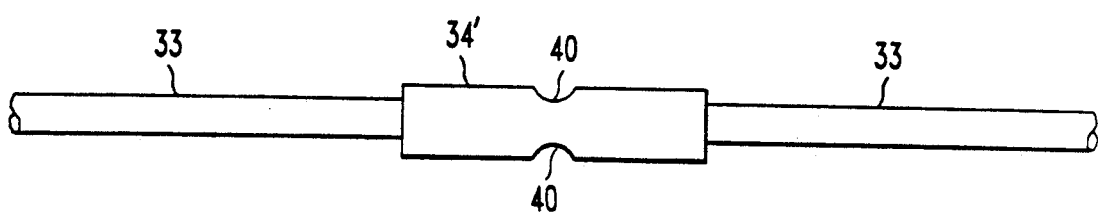
FIG. 14 is a side view of an unsevered ribbon connector in accordance with another embodiment of the invention.

Referring to FIG. 14, as an aid to use in the field of the optical fiber ribbon, the connectors 34 of FIG. 12 may be made to be in the shape 34' shown in the Figure in which indentations 40 have been made in the outer periphery as a guide for making a properly located cut.

In summary, a method has been described for providing connectors to optical fiber ribbons as part of the fabrication process of the optical fiber ribbons. After completion of the fabrication, severed lengths of the optical fiber ribbon can be connected to other ribbons or other optical fiber connectors by simply plugging together matching connectors. Axial spring loading can be externally applied if so desired, one example of which has been shown, or can be internally applied as part of the molding operation. The need for individually attaching connectors to the optical fiber ribbons in the field is eliminated and the use of fiber ribbon is simplified. The connectors can be provided at regular lengths or at irregular intervals as is dictated by the use to which they are to be put. Experiment has shown that the connectors manufactured as described are quite robust and that the optical fiber ends are held in precision alignment, notwithstanding rough handling of the optical fiber ribbon.

The use of monocrystalline support members for permitting precisely etched V-grooves, while advantageous for the reasons given above, may not be necessary, depending on alignment tolerances. If the fibers are "multimode," for example, as opposed to "single mode," tolerances may be sufficiently low to allow the V-grooves, for example, to be machined, rather than etched, or to be formed in molded plastic. Each of the two support members 18 and 19 could initially be integrated with half of encapsulation 24 (FIG. 8), to obviate the injection molding step (FIG. 7); in such case, the two encapsulation halves, as well as support members 18 and 19, would be bonded together with an adhesive. Various other embodiments and modifications of the invention may be made by those skilled in the art without departing from the spirit and scope of the invention.

I claim:

1. A method for applying a connector to an optical fiber ribbon comprising a parallel array of optical fibers held in position and encapsulated by a plastic ribbon encapsulation, said method comprising the steps of:
   selectively removing the ribbon encapsulation from a middle portion of the optical fiber ribbon while leaving intact separated ribbon portions and first optical fiber portions extending between said separated ribbon portions;
   containing the first optical fiber portions between a pair of first optical fiber support members on opposite sides thereof;
   cutting transversely to the first optical fiber portions through the first support members and the first optical fiber portions;
   polishing exposed ends of the first optical fiber portions;
   and aligning and abutting second optical fibers contained between opposite second optical fiber support members with said first optical fiber portions such that optical energy can be transmitted from the first optical fiber portions to the second optical fibers.

2. The method of claim 1 further comprising the step of:
   after the containing step, encapsulating the support members in a plastic encapsulation;
   and wherein the cutting step further comprises the step of cutting through the plastic encapsulation.

3. The method of claim 1 wherein:
   the optical fiber support members are made of crystalline material;
   and individual grooves for supporting the optical fiber portions are made in the support members by photolithographic masking and etching.

4. The method of claim 1 wherein:
   the optical fiber support members define an alignment aperture that extends substantially parallel to said first optical fiber portions;
   and the second optical fiber support members supporting the second optical fibers contain an alignment pin adapted to be inserted into said alignment aperture.

5. The method of claim 2 wherein:
   the first optical fiber support members define an alignment aperture that extends substantially parallel to the first optical fiber portions, but which is substantially sealed from the environment during the encapsulating step, whereby no plastic is injected into the alignment aperture;
   the cutting step further comprises the step of cutting through the alignment aperture, thereby to expose the alignment aperture;
   and the aligning step comprises the step of inserting an alignment pin into the alignment aperture.

6. The method of claim 5 wherein:
   the encapsulating step comprises the step of enclosing the first optical fiber support members in a mold;
   and injecting a plastic material into said mold.

7. The method of claim 1 wherein:
   a plurality of middle portions of the ribbon encapsulation are etched while leaving intact optical fiber portions extending across each of said middle portions;
   containing each of the exposed optical fiber portions of each of the middle portions between a pair of optical fiber support members;
   encapsulating each pair of optical fiber support members in a second encapsulation;
   and cutting transversely to the optical fiber portions through each second encapsulation, each pair of support members and each of the optical fiber portions.

8. The method of claim 7 wherein:
   after the encapsulation step, but before the cutting step, winding said ribbon about a spool, whereby said ribbon may be stored and unwound prior to cutting.

9. The method of claim 1 wherein:
   after the aligning and abutting step, a clamp member is applied for exerting an axial force pressing the first optical fiber support members against the second optical fiber support members.

10. A method for making connectors to optical fiber ribbons comprising the steps of:
    removing the optical fiber ribbon encapsulation at a plurality of locations on the optical fiber ribbon, thereby to expose a plurality of arrays of parallel optical fiber segments;
    forming matching first grooves on matching surfaces of each of a plurality of pairs of support members;

containing each of the exposed optical fiber segment arrays within the matching first grooves of a pair of support members on opposite sides thereof;

encapsulating each pair of support members with an encapsulant material;

successively cutting transversely to the arrays of optical fiber segments by cutting through the optical fiber support member encapsulant, the pair of support members, and the array of optical fiber segments;

and polishing ends of the optical fiber segments that have been exposed by said cutting step.

11. The method of claim 10 further comprising the step of:

forming within each pair of optical fiber support members second alignment grooves which define an alignment aperture that extends substantially parallel to the optical fiber grooves;

said alignment aperture being adapted to receive an alignment pin for aligning the ends of optical fiber segments with the ends of other optical fibers.

12. The method of claim 11 wherein:

the support members are made of a monocrystalline material;

and the first and second V-grooves are made by photolithographic masking and etching.

13. The method of claim 12 wherein:

the alignment pin includes a spring member adapted to spring bias one side of the alignment pin against one side of the alignment aperture.

14. The method of claim 10 wherein:

prior to the cutting step, the optical fiber ribbon is wound around a spool.

15. The method of claim 10 wherein:

prior to the step of containing an array of optical fiber segments, tension is applied to such segments.

16. The method of claim 10 wherein:

the encapsulating step comprises the step of injection molding plastic encapsulant material around the pair of support members.

17. The method of claim 10 wherein:

the containing step comprises the step of bonding together the pair of support members, and bonding the optical fiber segment array to the pair of support members.

18. The method of claim 10 wherein:

the optical fiber ribbon encapsulation is made of plastic;

the optical fiber is made predominantly of glass;

and the removing step comprises the step of exposing said ribbon at said plurality of locations to an etchant that etches said plastic but does not etch said glass.

* * * * *